US011030900B2

(12) United States Patent
Klarner et al.

(10) Patent No.: US 11,030,900 B2
(45) Date of Patent: Jun. 8, 2021

(54) SYSTEM AND METHOD FOR AUTOMATICALLY CONTROLLING A VEHICLE IN A TRAFFIC NETWORK

(71) Applicant: Deutsches Zentrum für Luft- und Raumfahrt e.V., Cologne (DE)

(72) Inventors: Robert Klarner, Munich (DE); Hartmut Runge, Munich (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 0 days.

(21) Appl. No.: 16/496,099

(22) PCT Filed: Mar. 20, 2018

(86) PCT No.: PCT/EP2018/056984
§ 371 (c)(1),
(2) Date: Sep. 20, 2019

(87) PCT Pub. No.: WO2018/172334
PCT Pub. Date: Sep. 27, 2018

(65) Prior Publication Data
US 2020/0098256 A1 Mar. 26, 2020

(30) Foreign Application Priority Data

Mar. 21, 2017 (DE) ...................... 10 2017 106 032.4

(51) Int. Cl.
*G08G 1/0967* (2006.01)
*B60Q 1/50* (2006.01)
(Continued)

(52) U.S. Cl.
CPC ......... *G08G 1/096716* (2013.01); *B60Q 1/50* (2013.01); *G05D 1/02* (2013.01);
(Continued)

(58) Field of Classification Search
None
See application file for complete search history.

(56) References Cited

U.S. PATENT DOCUMENTS

| 6,084,510 A | 7/2000 | Lemelson et al. |
| 2004/0158366 A1 | 8/2004 | Dieterle |

(Continued)

FOREIGN PATENT DOCUMENTS

| DE | 10200002 A1 | 8/2002 |
| DE | 10204137 A1 | 8/2003 |

(Continued)

OTHER PUBLICATIONS

English translation of the International Preliminary Report on Patentability issued in International Application No. PCT/EP2018/056984 dated Oct. 3, 2019.

*Primary Examiner* — Curtis A Kuntz
*Assistant Examiner* — Shawna M Kingston
(74) *Attorney, Agent, or Firm* — Hoffmann & Baron, LLP

(57) ABSTRACT

The invention relates to a system and a method for automatically controlling a vehicle F in a traffic network, comprising a central unit which provides respective envelopes $EH_i$ of a number I of flat geographical sub-regions $TB_i$ of the traffic network, as well as an assigned attribute $K_i$ for each of the geographical sub-regions $TB_i$, wherein the attribute $K_i$ indicates the intensity of a risk posed to the vehicle F itself and/or to objects arranged in the sub-region $TB_i$ if the vehicle F should enter the respective geographical sub-region $TB_i$, the central unit and the vehicle F being designed and set up to communicate data, the vehicle F featuring: a first unit for determining the current position $POS_F$ of the vehicle F in the traffic network, a second unit for determining the distance $d_{EH^*}(POS_F)$ of the vehicle F from the envelope $EH^*$ of the sub-region $TB^*$ closest to the position $POS_F$, and a third unit for carrying out automatic control (Continued)

interventions SEG in the longitudinal and/or transversal control or regulation process of the vehicle F, the automatic control interventions SEG being executed depending on the distance $d_{EH*}(POS_F)$ and on the attribute K* assigned to the closest sub-region TB*.

18 Claims, 2 Drawing Sheets

(51) Int. Cl.
*G05D 1/02* (2020.01)
*G08G 1/01* (2006.01)
*G08G 1/16* (2006.01)

(52) U.S. Cl.
CPC ....... *G08G 1/0104* (2013.01); *G08G 1/09675* (2013.01); *G08G 1/096741* (2013.01); *G08G 1/096775* (2013.01); *G08G 1/16* (2013.01)

(56) References Cited

U.S. PATENT DOCUMENTS

| | | |
|---|---|---|
| 2010/0194592 A1 | 8/2010 | Yim et al. |
| 2013/0018572 A1 | 1/2013 | Jang |
| 2013/0179047 A1 | 7/2013 | Miller et al. |

FOREIGN PATENT DOCUMENTS

| | | |
|---|---|---|
| DE | 102 10 546 A1 | 9/2003 |
| DE | 102007033664 A1 | 3/2008 |
| DE | 102008040630 A1 | 1/2010 |
| DE | 102008044012 A1 | 5/2010 |
| DE | 102013100206 A1 | 7/2013 | ial Patent Application No. PCT/EP2018/056984, filed on 20 Mar. 2018, which claims benefit of German Patent Application No. 10 2017 106 032.4, filed on 21 Mar. 2017, the contents of which are incorporated herein by reference in their entirety.
SYSTEM AND METHOD FOR AUTOMATICALLY CONTROLLING A VEHICLE IN A TRAFFIC NETWORK

CROSS-REFERENCE TO RELATED APPLICATIONS

This application is the U.S. National Phase of International Patent Application No. PCT/EP2018/056984, filed on 20 Mar. 2018, which claims benefit of German Patent Application No. 10 2017 106 032.4, filed on 21 Mar. 2017, the contents of which are incorporated herein by reference in their entirety.

BACKGROUND

Field

The invention relates to a system and a method for automatically controlling a vehicle in a traffic network. The invention serves the purpose of improving the safety in road traffic. The proposed system and method are useful, in particular, for fully autonomously, automatically driving vehicles, as well as for respective assisted driving systems for vehicles controlled by a driver.

Related Art

In prior art, assisted driving systems for vehicles are known that comprise sensor systems arranged on the vehicle for capturing the surroundings of the vehicle. By evaluating the data captured by the sensor systems, it is possible, for instance, to detect objects in a driving lane or on the side of a driving lane, and countermeasures can be initiated to avoid a collision between the vehicle and the detected objects. These countermeasures include, in particular, autonomous interventions in the longitudinal and/or the transversal control of the vehicle.

SUMMARY

The task of the invention is to provide a system and a method for automatically controlling a vehicle in a traffic network, specifically an autonomously driving vehicle, which improve the operation safety of the vehicle in the traffic network.

The invention follows from the features the independent claims. Advantageous further developments and embodiments are the subject of the dependent claims. Additional features, possible application, and advantages of the invention follow from the following description, as well as from the explanations of example embodiments of the invention that are shown in the drawings.

A first aspect of the invention pertains to a system for automatically controlling a vehicle F in a traffic network. The system comprises a central unit ZE, which provides respective envelopes $EH_i$ of a number I of flat geographical sub-regions $TB_i$ of the traffic network, as well as for each of the geographical sub-regions $TB_i$ an associated attribute $K_i$, wherein i=1, . . . , I and I≥1 and $EH_i \in \{EH_1, \ldots, EH_I\} = \underline{EH}$ and $TB_i \in \{TB_1, \ldots, TB_I\} = \underline{TB}$. The attribute $K_i$ indicates an intensity of a risk posed to the vehicle F and/or to objects arranged in the sub-region $TB_i$ if the vehicle F should enter the respective geographical sub-region $TB_i$, wherein $K_i \in \{K_1, \ldots K_N\} = \underline{K}$ and N≥1. The central unit ZE and the vehicle F are designed and set up to communicate data, in particular to transmit the envelopes $EH_i$ and the associated attributes K from the central unit ZE to the vehicle F. The vehicle F further features as follows: a first unit for determining the current position $POS_F$ of the vehicle in the traffic network, a second unit for determining a distance $d_{EH^*}(POS_F)$ of the vehicle from the envelope EH* of the sub-region TB* closest to the position $POS_F$, wherein $TB^* \in \underline{TB}$, and a third unit for carrying out automatic control interventions SEG in the longitudinal and/or transversal control or regulation process of the vehicle F, wherein the automatic control interventions SEG are executed depending on the distance $d_{EH^*}(POS_F)$ and on the attribute K* assigned to the closest sub-region TB*:

$$SEG = SEG(d_{EH^*}(POS_F), K^*), \text{ wherein } K^* \in \underline{K} \quad (1)$$

Herein, the concept of "vehicle" advantageously comprises, in particular, motor vehicles, electric vehicles, buses, trucks, and motor bikes.

Herein, the concept of "traffic network" should be understood to mean a surface area under or above ground, featuring traffic routes, wherein the traffic routes may, can, and should be used for their respective purposes by their respective users (pedestrians, bicyclists, motorcycles, motor vehicles, trucks, tramways, light rail vehicles, trains, etc.). The traffic network comprises, in particular, without limitation, the following traffic routes: freeways, highways, country roads, streets, forest roads, bicycle lanes, footpaths, squares, parking lots, parking spaces, railroad crossings, crosswalks, shoulders, etc. Advantageously, the concept of "traffic network" also comprises areas adjacent to traffic routes and/or the entire area between individual traffic routes. Advantageously, the adjacent areas comprise at least a strip of land in the range of 1 m to 1,000 m on the sides of the respective traffic routes.

Herein, the concept of "sub-region $TB_i$" is understood to mean a ground surface, comprising at least one traffic route of the traffic network, or is at least adjacent to such a traffic route. Depending on circumstances, the sub-regions $TB_i$ may have different (surface) sizes. A sub-region $TB_i$ may, for instance, include an ungated railroad crossing and 50 m of roadway in each direction, or a section of freeway with a length of 1 km, or a square on which a Christmas fair is held, or a low speed zone near a hospital, a school, or a kindergarten, or a pedestrian zone. Every sub-region $TB_i$ advantageously defines an area for which the entrance of a vehicle F into the sub-region $TB_i$ poses a risk intensity for the vehicle F itself and/or for objects arranged in the sub-region $TB_i$ that is larger than zero and that is not negligible. Correspondingly, the associated attributes $K_i$ advantageously indicate a risk intensity that is larger than zero and that is not negligible.

The central unit ZE preferably comprises at least one data processing unit (computer, server, etc.) as well as a data storage for storing and providing the envelopes $EH_i$ and the associated attributes $K_i$. Advantageously, the central unit ZE comprises further communication interfaces for data transfer between the central unit ZE and the vehicle F, as well as between the central unit ZE and input interfaces for the specification/input of envelopes $EH_i$ and associated attributes $K_i$.

Herein, the concept of "envelope" (also referred to as "envelope curve") is in particular understood to mean the side or the border or the boundary line of the two-dimensional geographical sub-regions $TB_i$. The envelopes $EH_i$ may be specified, for instance, as coordinate functions and/or as a plurality of coordinate points. In the latter case, interpolation between coordinate points is needed in order to generate the respectively required linear envelopes $EH_i$.

Preferably, the envelopes $EH_i$ are specified in geo-referenced coordinates, such that the distance $d_{EH*}(POS_F)$ can be easily determined from a position $POS_F$ of the vehicle F as specified in geo-referenced coordinates and from the known development the respective closest envelope EH*. Advantageously, the envelopes $EH_i$, and therefore the sub-regions $TB_i$, are selected such that the sub-regions $TB_i$ are minimized with respect to their surface areas to the extent that makes the protection of the sub-region $TB_i$ sufficiently possible. The sub-regions $TB_i$ may specifically also be understood as protected regions, on which driving by vehicles F is either prohibited or only permitted subject to conditions, wherein the risk intensity associated with attribute $K_i$ reflects respective prohibitions or conditions.

The attribute $K_i$ indicates the intensity of the risk for the sub-region $TB_i$ as defined above. The attribute $K_i$ is advantageously defined or determined as a numeric value or as a class identifier of a risk category. The attribute $K_i$ may only take values or identifiers from the specified quantity $\{K_1, \ldots, K_N\} = \underline{K}$, wherein the quantity $\{K_1, \ldots, K_N\}$ may also be an actual numeric range $[K_1, K_N] = \underline{K}$. Every sub-region $TB_i$ can therefore only be assigned an attribute $K_i$ with a "value" from $\underline{K}$ An attribute $K_i$, and therefore the intensity of the risk, may either be defined as such, or be derived from determined or specified parameters based on a specified algorithm. In the simplest case, a sub-region $TB_i$ as well as the associated attribute K are defined by an authority (the police, municipal administration, border control agency, etc.) and provided to the central unit ZE.

Depending on the choice of attributes $K_i$, a sub-region $TB_i$ of the traffic network may therefore be assigned a high or a low risk category or risk intensity, which pertains in particular to the risk posed by an entering vehicle F to the persons or objects hypothetically present or present in fact in the sub-region. High risk categories are advantageously assigned to sub-regions $TB_i$ in which people or crowds of people are present, or in which an accident has already happened on a traffic route of the sub-region $TB_i$, or in which a train is approaching an ungated railroad crossing in the sub-region $TB_i$, or in which an entry of a vehicle into the sub-region $TB_i$ would lead to a different type of high risk potential, such that an entry of a vehicle into such a sub-regions $TB_i$ must be prevented in all circumstances. Advantageously, the control interventions SEG are performed in such a manner that a respective longitudinal and transversal control would autonomously control the vehicle F such that it is prevented from entering into the respective sub-region $TB_i$. Advantageously, also taken into account for these purposes are sensor data determined by at least one sensor system of the vehicle F, and which describe an environment as well as the traffic conditions prevailing therein, in order to ensure that the environment and the current traffic conditions are taken into account when the control interventions SEG are performed. A medium or low risk category or intensity is thus advantageously assigned to sub-regions $TB_i$ for which the entrance into or driving through these sub-regions $TB_i$ is possible, subject to certain conditions (for instance, the observance of a speed limit of 30 km/h).

As mentioned previously, the central unit ZE and the vehicle F are designed and set up to communicate data, in particular to transmit the envelopes $EH_i$ and the associated attributes $K_i$ from the central unit ZE to the vehicle F. This data communication takes place advantageously via mobile internet or by way of another known telecommunication network technology. The transmission of envelopes $EH_i$ and of the associated attribute $K_i$ by the central unit ZE to the vehicle F takes place advantageously depending on the current position $POS_F$ of the vehicle F only for the sub-regions $TB_i$ in a specified environment relative to the vehicle F (for instance, within a distance of 5 km, 10 km, 15 km, or 20 km), and/or for sub-regions $TB_i$ that are along a typical route (for instance, the way from the home address to the work address) of the vehicle F. In this case, the vehicle F advantageously transmits the position $POS_F$ of the vehicle F on a continuous basis. As a result, the amount of data intended for transmission is reduced accordingly, based on actual relevance or validity.

A first unit for determining the current position $POS_F$ of the vehicle F is advantageously a satellite navigation receiver GNSS, which advantageously determines a geo-referenced position of the vehicle F in the traffic network. Naturally, all other currently known location detection devices and combinations thereof can be used by way of a first unit.

Based on the current position $POS_F$ of the vehicle F, a second unit determines a current distance $d_{EH*}(POS_F)$ of the vehicle F from the envelope EH* of the sub-region TB* closest to the position $POS_F$. Advantageously, the current distance $d_{EH*}(POS_F)$ is determined with an accuracy of up to 2 cm to 5 cm. The distance $d_{EH*}(POS_F)$ is advantageously determined as a minimum distance from the vehicle F to the envelope EH*. The second unit advantageously comprises a processor with a respective program for determining the distance $d_{EH*}(POS_F)$. The distance $d_{EH*}(POS_F)$ may indicate a metric distance (for instance, one measured in meters) or a distance measured in time (for instance, one measured in seconds) until the envelope EH* is reached, assuming that the vehicle F continues at its current own speed.

A third unit allows for carrying out automatic control interventions SEG in the longitudinal and/or transversal control or regulation process of the vehicle F. For these purposes, the third unit is coupled advantageously with the engine control and/or the control of the braking system and/or with actuators for setting the transversal control of the vehicle F. According to the invention, the control interventions SEG take place depending on approaching the closest sub-region TB*, in other words, depending on the distance $d_{EH*}(POS_F)$, and at the same time also depending on the attribute K* associated with the closest sub-regions TB*.

Advantageously, the third unit is coupled with at least one sensor system in the vehicle F, which captures the surroundings of the vehicle and the objects arranged therein, and generates respective environmental data. Advantageously, the sensor system determines traffic conditions in the surroundings and provides them to the third unit. Advantageously, the automatic control interventions SEG in the longitudinal and/or the transversal control or regulation process of the vehicle F take place depending on the environmental data and/or the data for the traffic conditions determined for this environment. Advantageously, the sensor system comprises a radar sensor, a LIDAR sensor, a laser scanner, a microwave scanner, an ultrasound sensor, an optical camera, or a combination of the above.

The proposed system therefore makes possible a variety of driver-independent control interventions, in other words: control interventions performed autonomously by the vehicle F, in order to minimize or exclude risks that are posed when approaching sub-regions $TB_i$ or when driving through sub-regions $TB_i$ of the traffic network. The vehicles F may be fully autonomously driving vehicles or vehicles controlled by a driver, wherein advantageously, in the latter type of vehicles, the autonomous control interventions SEG initiated by the third unit cannot be overruled by the respective driver of the vehicle F.

An advantageous further development of the proposed system is characterized in that the third unit is set up and designed to execute automatic control interventions SEG ($d_{EH*}(POS_F)$, K*) only when the distance $d_{EH*}(POS_F)$ to sub-region TB* closest to the position $POS_F$ reaches or undershoots a specified distance threshold value $G_K*$ that is dependent on the associated attribute K*. Advantageously, the distance threshold value $G_K*$ is transmitted by the central unit to the vehicle F as well.

An advantageous further development of the proposed system is characterized in that the vehicle F features a prediction unit, which can determine a future trajectory $FT_{präd}$ (for instance, the most probable future path) of the vehicle F. Advantageously, the third unit is also set up and designed to determine and execute the automatic control interventions SEG depending on the trajectory $FT_{präd}$: SEG=SEG($d_{EH*}(POS_F)$, K*, $FT_{präd}$).

An advantageous further development of the proposed system is characterized in that the vehicle F features a unit that determines the current speed $V_{FZ}$ of the vehicle F. Advantageously, the third unit is also set up and designed to determine and execute the automatic control interventions SEG depending on the speed $V_{FZ}$:SEG=SEG($d_{EH*}(POS_F)$, K*, $V_{FZ}$).

An advantageous further development of the proposed system is characterized in that the automatic control interventions SEG($d_{EH*}(POS_F)$, K*) comprise at least one of the following control interventions: a reduction of the speed of the vehicle F to a predetermined speed $v_{soll}$ that is dependent on K* and/or on $d_{EH*}(POS_F)$, and/or on slowing down the vehicle F to a stationary position, and/or a longitudinal and transversal control preventing the vehicle F from entering into the closest sub-region TB*. In particular, the last two control interventions advantageously take into account the current environmental data captured in the vehicle F in order to prevent collisions of the vehicle F.

An advantageous further development of the proposed system is characterized in that the vehicle F features a fourth unit, which, depending on the distance $d_{EH*}(POS_F)$ from the sub-region TB* that is closest to the position $POS_F$, and depending on the associated attribute K*, automatically actuates a system of the vehicle F for the output of optical and/or acoustic and/or haptic signals to one or more occupants of the vehicle F and/or to the surroundings of the vehicle F. By outputting these signals, the occupant(s) may be informed, for instance, that the vehicle F is approaching a sub-region TB* which, if driving is continued, pose an increased risk potential. Alternatively or additionally, the output of one of these signals may indicate the execution of an autonomous control intervention SEG.

Naturally, the entrance of the vehicle F into a closest sub-region TB* is possible, to the extent that the associated attribute K* meets certain predetermined criteria. If the vehicle F enters into such a closest sub-region TB*, the vehicle F, depending on the associated attribute K*, is advantageously prompted to emit optical and/or acoustical warning signals to the surroundings of the vehicle F as it moves through the sub-region TB*. In this further development, therefore, sub-regions TB* can be defined in which the vehicle F travels slowly, for instance at <=40 km/h or at <=30 km/h, such that, in particular, in case of electrical vehicles and hybrid vehicles with an electric drive, as well as e-bikes, all of which are characterized by low noise emissions, and which might therefore not be acoustically noticed by passers-by, or only be noticed too late. In such a case, the vehicle F automatically, advantageously emits an acoustical and/or optical signal to the environment, so as to allow passers-by to notice the approach of the vehicle F in a timely manner.

An advantageous further development of the proposed system is characterized in that the fourth unit comprises a monitor or a display and/or a light source and/or an acoustic output unit and/or a unit for the output of haptic information.

An advantageous further development of the proposed system is characterized in that the vehicle F comprises a fifth unit which, depending on the distance $d_{EH*}(POS_F)$ from the sub-region TB* that is closest to the position $POS_F$, and depending on the associated attribute K*, automatically causes the vehicle F to slow down to a stationary position, and then powers it down electrically. In respectively selected sub-regions TB*, vehicles F may be systematically caused to slow and be powered down on a road segment, for instance.

An advantageous further development of the proposed system is characterized in that the central unit comprises an interface for manual input or specification of envelopes $EH_i$ of flat geographical sub-regions $TB_i$ of the traffic network. For the definition of a sub-region $TB_i$ by predetermined boundary coordinates, this interface may comprise an input keypad. Alternatively or additionally, this interface may comprise a touch screen, a computer mouse, a joystick, or gesture recognition for graphic input of the associated envelopes $EH_i$. Advantageously, this interface has access to an archive memory in which envelopes $EH_i$ are stored, and from which they can be manually selected. Advantageously, start and end times of a respective activation of the sub-regions $TB_i$ associated with the respective envelopes $EH_i$ can be stored for envelopes $EH_i$, stored in the archive memory. In that case, the activation or deactivation of the sub-regions $TB_i$ and the provision of the envelopes $EH_i$ is advantageously done depending on the progress of the current time t. Thus, temporarily recurring activations and deactivations of sub-regions $TB_i$ are possible as well. This interface can be utilized in particular by authorities, by the police, by traffic monitoring devices, etc., for instance in order to temporarily or permanently designate certain sub-regions $TB_i$ of the traffic network and to assign a respective "risk" attribute K to them. This interface may be stationary or mobile, the interface being respectively connected with the central unit for data transmission. In particular, multiple of such interfaces may be available.

An advantageous further development of the proposed system is characterized in that a sixth unit is provided which, based on the current position $POS_{FZ}$ of a vehicle FZ in the traffic network as transmitted by the vehicle FZ to the sixth unit, and depending on an attribute $A_{FZ}$ transmitted by the vehicle FZ from position $POS_{FZ}$ to the sixth unit, indicates a critical technical and/or traffic-related condition of the vehicle FZ, automatically determines an envelope EH of a geographical sub-region TB of the traffic network around the position $POS_{FZ}$ and an attribute K associated with the sub-region TB and provides them to the central unit, wherein TB∈TB and K∈K.

The sixth unit advantageously comprises a processor and a respective program running on it. The sixth unit is advantageously arranged in the central unit.

Advantageously, the attribute $A_{FZ}$ indicates at least one of the critical technical and/or traffic-related conditions of the vehicle FZ from the following non-exhaustive list:

the activation of an airbag of the vehicle FZ,
the activation of hazard warning lights of the vehicle FZ,
the activation of a fire alarm system of the vehicle FZ, the activation of a fire extinguishing system of the vehicle FZ, the activation of an eCall mode for an automatic emergency notification in the vehicle FZ, the overshooting of a specified acceleration threshold value G1 by the vehicle FZ, and the movement of vehicle FZ in the traffic network in an unauthorized travel direction and/or an unauthorized traffic lane.

The attribute $A_{FZ}$ may have different values or identifiers, indicating different degrees of criticality of the condition. As soon as an aforementioned attribute $A_{FZ}$ or one describing a different critical condition is transmitted by the vehicle FZ from the position $POS_{FZ}$ to the sixth unit, in this embodiment of the sixth unit, automatically, an envelope EH of a geographical sub-region TB of the traffic network around the position $POS_{FZ}$ and an attribute K associated with the sub-region TB are determined and provided to the central unit.

The following example may explain the functionality: The vehicle FZ has an accident while driving on the freeway due to aquaplaning, as a result of which an airbag of the vehicle FZ is activated. The vehicle FZ is set up to automatically transmit in this event its exact position $POS_{FZ}$ and an associated emergency signal (attribute $A_{FZ}$) to the sixth unit. Based on the transmitted position $POS_{FZ}$ and on the transmitted associated attributes $A_{FZ}$, the sixth unit recognizes that the vehicle FZ is no longer moving and that an airbag of the vehicle FZ was activated. Based on this information, the sixth unit determines an envelope EH of a geographical sub-region TB of the traffic network around the position $POS_{FZ}$ and an attribute K associated with the sub-region TB. In this case, the sub-region comprises, for instance, a segment of the affected driving lane of the freeway, of 500 m from the position $POS_{FZ}$ in either direction. The associated attribute K indicates a high risk intensity, such that automatic control interventions are executed in vehicles F approaching the sub-region TB in such a manner that ensures that the vehicles F do not enter into the sub-region TB**.

The vehicle FZ advantageously features a sensor system designed and set up to determine the attribute $A_{FZ}$, which first determines a technical condition of the vehicle FZ itself and/or a traffic situation that the vehicle FZ is in. For these purposes, the vehicle advantageously has a plurality of sensors that determine and analyze a current systemic vehicle condition, and/or sensors that determine and analyze a traffic condition in the surroundings of the vehicle FZ. To the extent that the analysis result(s) (of the technical and/or traffic condition of the vehicle FZ) are determined, for instance, to be "critical" according to the predetermined categorizations, the attribute $A_{FZ}$ associated with the respective criticality category is generated or determined.

An advantageous further development of the proposed system is characterized in that the following time-dependency applies for the envelope EH of the geographical sub-region TB:

$$EH^{}=EH^{}(POS_{FZ}(t)) \text{ and } TB^{}=TB^{}(POS_{FZ}(t)). \quad (2)$$

Advantageously, vehicles FZ transmit their current position $POS_{FZ}(t)$ to the central unit ZE for these purposes. Based on the current position $POS_{FZ}(t)$, the central unit ZE, which is acquainted with the traffic network, may determine whether a vehicle FZ is a "ghost rider", in other words, a vehicle driving against traffic on a freeway. As indicated, the proposed further development makes possible the definition of time-variable sub-regions TB or of time-variable envelopes EH. This further development is therefore particularly suitable for the definition of time-variable sub-regions TB** (for instance a time-variable safety zone moving along with a vehicle FZ) in order to define a safety zone around a "ghost rider" vehicle FZ driving in the wrong direction or in the wrong driving lane. When other vehicles F approach this safety zone, autonomous steering interventions may be executed in such a manner, for instance, that such vehicles can be autonomously brought to a stationary position on the side of the road.

In an advantageous further development, there are multiple such vehicles $F_p$, these vehicles $F_p$ all being equipped and set up for mutual data communication. Furthermore advantageously, these vehicles $F_p$ are designed and set up to identify whether the respective vehicle $F_p$ is in a critical technical and/or a traffic condition. Furthermore advantageously, these vehicles $F_p$ are designed and set up such that upon the incidence of such a critical state of a respective vehicle $F_{p*}$ of the vehicles $F_p$, the respective vehicle $F_{p*}$ automatically, or upon input by a respective vehicle user, determines an envelope EH** of a geographical sub-region TB** of the traffic network around the position $POS_{Fp*}$ of the vehicle $F_{p*}$ and an attribute K** associated with the sub-region TB** and transmits them to vehicles $F_p$ in an area surrounding the vehicle $F_{p*}$.

In this further development, vehicles $F_{p*}$ (such as snow plows, vehicles transporting heavy or hazardous loads, convoys, agricultural machinery, construction vehicles on moving roadworks, vehicles moving on railroad networks, etc.) can generate a sub-region TB**** around the position $POS_{Fp*}$ of the respective vehicle $F_{p*}$ with an associated attribute K**** and transmit it to vehicles $F_p$ in their surroundings (for instance within a circumference of up to 2 km). In the event that the vehicle $F_{p*}$ is a railroad vehicle, for instance, this allows for a targeted prevention of accidents at railroad crossings (intersections of traffic networks and railroad networks).

Furthermore, such a sub-region TB** with an associated attribute K** can also be automatically determined by a vehicle $F_{p*}$ and transmitted to other vehicles $F_p$ as soon as the vehicle $F_{p*}$ determines internally that the movement of the vehicle $F_{p*}$ is in violation of predetermined rules, in particular of traffic rules. Therefore, it is possible, in particular, that the vehicle $F_{p*}$ to the extent that it becomes a "ghost rider", in other words, that the vehicle $F_{p*}$ is driving contrary to the designated travel direction of that driving lane, or when the vehicle $F_{p*}$ travels too fast, generates such a sub-region TB** with an associated attribute K**.

An advantageous further development of the proposed system is characterized in that a seventh unit is provided which, based on an attribute $A_{infra}$, transmitted to the seventh unit by a traffic infrastructure unit $V_{infra}$ arranged at a position $POS_{infra}$ in the traffic network which has at least one sensor system for capturing a traffic condition and/or weather conditions in the surroundings of the traffic infrastructure unit $V_{infra}$, the attribute indicating the critical traffic and/or weather conditions in the area of the traffic infrastructure unit $V_{infra}$, automatically determines an envelope EH* of a geographical sub-region TB* around the position $POS_{infra}$, as well as an associated attribute K*, and provides them to the central unit ZE, wherein EH*∈EH, TB*∈TB, and K*∈K, and wherein the infrastructure unit $V_{infra}$ is designed and set up to determine whether there are critical traffic and/or weather conditions, and to determine an associated attribute $A_{infra}$, based on sensor data captured with the sensor system.

Herein, the concept of "infrastructure unit $V_{infra}$" is understood to mean a stationary unit having a respective sensor system as mentioned above, or at least being connected with such a system. The infrastructure unit may be, for instance, a traffic light system, a traffic sign, a guardrail, a traffic control system, a sensor detecting people in the driving lane or on a crosswalk, or a meteorological measuring station, etc.

The seventh unit advantageously comprises a processor and a respective program running on it. The seventh unit is advantageously arranged in the central unit. The attribute $A_{intra}$ may have different values or identifiers, indicating different degrees of criticality of the condition.

Advantageously, the attribute $A_{infra}$ indicates at least one critical traffic condition and/or critical weather conditions from the following non-exhaustive list for an environment covered by the respective sensor system:
- an accident,
- the crossing of wildlife,
- a vehicle traveling in an unauthorized direction and/or in a wrong traffic lane,
- a train approaching a controlled or uncontrolled railroad crossing,
- people and/or objects in the driving lane,
- a crowd of people right next to the traffic route,
- aquaplaning on a traffic route,
- snowfall,
- sheet ice or black ice conditions,
- strong rain,
- strong side winds or squalls,
- fog, mist, or smoky conditions with a visibility below a specified threshold value, and
- ice.

The proposed system and method are useful in particular for fully autonomously, automatically driving vehicles, as well as for respective assisted driving systems for vehicles controlled by a driver. In the first case, the attributes K* specified for the sub-regions $TB_i$ by the central unit ZE are automatically converted into respective control commands. In the second case, an active human driver remains involved, but is monitored by a respective assisted driving system, with automatic countermeasures (automated control input) only taking place in the event of danger. These countermeasures include the emission of warning signals, as well as active counter-steering or slowing down the vehicle F.

An additional aspect of the present invention relates to a method for automatically controlling a vehicle F in a traffic network, comprising the following steps: providing respective envelopes $EH_i$ of a number I of flat geographical sub-regions $TB_i$ of the traffic network, providing for each of the geographical sub-regions $TB_i$ an associated attribute $K_i$, the provision by a central unit ZE, wherein i=1, . . . , I and I≥1 and $TB_i \in \{TB_1, \ldots, TB_I\} = \underline{TB}$, wherein the attribute $K_i$ indicates a risk intensity, posed to the vehicle F and/or to objects arranged in the sub-region $TB_i$ if the vehicle F should enter the respective geographical sub-region $TB_i$, wherein $K_i \in \{K_1, \ldots K_N\} = \underline{K}$ and N≥1; transmitting by the central unit ZE of one or more envelopes $EH_i$ and of the associated attributes $K_i$ to the vehicle F; determining the current position $POS_F$ of the vehicle F in the traffic network; determining a distance $d_{EH^*}(POS_F)$ of the vehicle F to the envelope EH* of the sub-region TB* that is closest to the position $POS_F$, wherein $TB^* \in \underline{TB}$; executing automatic control interventions SEG in the longitudinal and/or transversal control or regulation process of the vehicle F, wherein the automatic control interventions SEG are executed depending on the distance $d_{EH^*}(POS_F)$ and on the attribute K* assigned to the closest sub-region TB*:

$$SEG = SEG(d_{EH^*}(POS_F), K^*), \text{ wherein } K^* \in \underline{K}. \quad (1)$$

Advantageous embodiments and advantages of the proposed method follow from the analogous and purposeful adaptation of the explanations provided above for the proposed system.

Additional advantages, features, and details follow from the following description, in which at least one example embodiment is described in detail, possibly with reference to the drawings. Identical, similar, and/or functionally analog components are provided with the same reference numbers.

DETAILED DESCRIPTION

Figure 1:
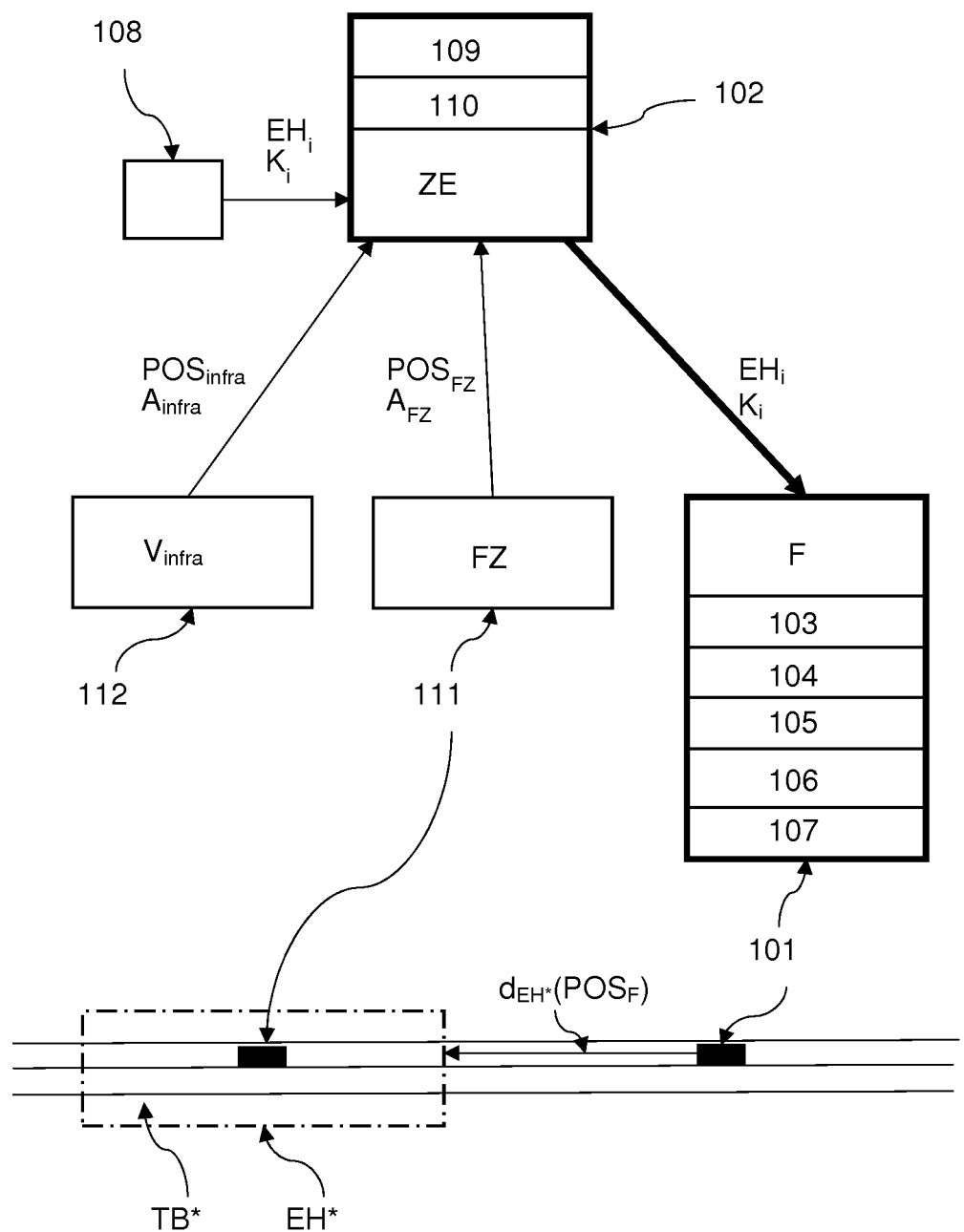
FIG. 1 shows a schematic of a proposed system.

FIG. 1 shows a schematic structure of a proposed system for automatically controlling a vehicle F 101 in a traffic network, having a central unit ZE 102 that provides respective envelopes $EH_i$ of a number I of flat geographical sub-regions $TB_i$ of the traffic network, as well as an assigned attribute K for each of the geographical sub-regions $TB_i$, wherein i=1, . . . , I and I≥1 and $TB_i \in \{TB_1, \ldots, TB_I\} = \underline{TB}$, wherein the attribute K indicates the intensity of a risk posed to objects arranged in the sub-region $TB_i$ if the vehicle F 101 should enter the respective geographical sub-region $TB_i$, wherein $K_i \in \{K_1, \ldots, K_N\} = \underline{K}$ and N≥1.

The central unit ZE 102 and the vehicle F 101 are designed and set up to communicate data, in particular to transmit the envelopes $EH_i$ and the associated attributes $K_i$ from the central unit 102 to the vehicle F 101. The central unit ZE 102 and the vehicle F 101 both have respective mobile internet transceiver units for these purposes.

The vehicle F 101 features: a first unit 103 for determining the current position $POS_F$ of the vehicle F 101 in the traffic network, a second unit 104 for determining a distance $d_{EH^*}(POS_F)$ of the vehicle F 101 from the envelope EH* of the sub-region TB* closest to the position $POS_F$, wherein $TB^* \in \underline{TB}$, and a third unit 105 for executing automatic control interventions SEG in the longitudinal and/or transversal control or regulation process of the vehicle F 101, wherein the automatic control interventions SEG are executed depending on the distance $d_{EH^*}(POS_F)$ and on the attribute K* assigned to the closest sub-region TB*:

$$SEG = SEG(d_{EH^*}(POS_F), K^*), \text{ wherein } K^* \in \underline{K}.$$

The vehicle F 101 also features a fourth unit 106 which, depending on the distance $d_{EH^*}(POS_F)$ to the sub-region TB* that is closest to the position $POS_F$, and depending on the associated attribute K*, automatically actuates a system of the vehicle F 101 for emitting optical and acoustic signals to occupants of the vehicle F 101 and to the surroundings of the vehicle F 101. The occupants as well as the surroundings, in other words, other vehicles in particular, are warned by the emitted signals, for instance, that the vehicle F 101 is autonomously emitting and executing control signals for longitudinal and/or transversal control.

The vehicle F 101 also features a fifth unit 107 which, depending on the distance $d_{EH^*}(POS_F)$ to the sub-region TB* that is closest to the position $POS_F$, and depending on the associated attribute K*, automatically causes the vehicle F 101 to slow down to a stationary position, and then powers it down electrically.

The central unit 102 features an interface 108 for the manual input of envelopes $EH_i$ of flat geographical sub-regions $TB_i$ of the traffic network.

The central unit ZE 102 also features a sixth unit 109 which, based on the current position $POS_{FZ}$ of a vehicle FZ in the traffic network as transmitted by the vehicle FZ to the sixth unit 109, and depending on a position-dependent attribute $A_{FZ}(POS_{FZ})$ transmitted by the vehicle FZ to the sixth unit, indicates a critical technical and/or traffic-related condition of the vehicle FZ, automatically determines an envelope EH of a geographical sub-region TB of the traffic network around the position $POS_{FZ}$ and an attribute K associated with the sub-region TB and provides them to the central unit ZE (102), wherein TB$\in\underline{TB}$ and K$\in\underline{K}$.

The central unit ZE 102 also features a seventh unit 110 which, based on an attribute $A_{infra}$, transmitted to the seventh unit 110 by a traffic infrastructure unit $V_{infra}$ arranged at a position $POS_{infra}$ in the traffic network which has at least one sensor system for capturing a traffic condition and/or weather conditions in the surroundings of the traffic infrastructure unit $V_{infra}$, the attribute indicating the critical traffic and/or weather conditions in the area of the traffic infrastructure unit $V_{infra}$, automatically determines an envelope EH* of a geographical sub-region TB* around the position $POS_{infra}$, as well as an associated attribute K*, and provides them to the central unit ZE 102, wherein EH*$\in\underline{EH}$, TB*$\in\underline{TB}$, and K*$\in\underline{K}$, and wherein the infrastructure unit $V_{infra}$ is designed and set up to determine whether there are critical traffic and/or weather conditions, and to determine an associated attribute $A_{infra}$, based on sensor data captured with the sensor system. The sensor system advantageously comprises a camera sensor, a laser sensor, an ultrasound sensor, a radar sensor, a temperature sensor, a humidity sensor, a dew point sensor, a precipitation sensor, a conductivity sensor, an icing sensor, or a combination thereof.

The lower part of FIG. 1 is a schematic illustration of a two-lane street, in which the vehicle FZ 111 has had an accident, and the airbag of the vehicle FZ 111 has been activated. The vehicle FZ 111 then transmitted an automatic emergency signal to the central unit ZE 102, in other words, to the sixth unit 109, the signal comprising the attribute $A_{FZ}$ (indicating the occurrence of an accident) and the position $POS_{FZ}$. The sixth unit 109 then automatically determines, based on the attribute $A_{FZ}(POS_{FZ})$ and the position $POS_{FZ}$, an envelope EH of a geographical sub-region TB around the position $POS_{FZ}$ of the vehicle FZ, as well as an attribute K associated with this sub-region TB, and provides both to the central unit ZE 102 as one of the sub-regions $\underline{TB}$ and the associated attributes $\underline{K}$. The central unit ZE 102 transmits, in this example embodiment, the associated envelopes $EH_i$ and the associated attributes $K_i$ for all sub-regions $\underline{TB}$ to the vehicle F 101.

In this case, the vehicle F 101 moves from right to left, approaching the vehicle FZ in the same traffic lane. The second unit 104 of the vehicle F continuously determines the distance $d_{EH*}(POS_F)$ of the vehicle F 101 from the envelope EH* of the sub-region TB* that is closest to the position $POS_F$, based on the data provided by the central unit ZE 102 and the current position $POS_F$ of the vehicle F 101 determined by the first unit 103.

Depending on the distance $d_{EH*}(POS_F)$ and on the attribute K* (presently=K**) associated with the nearest sub-region TB* (presently=TB**), automatic control interventions SEG in the longitudinal and/or transversal control or regulation process of the vehicle F 101 are executed by the unit 105 of the vehicle F 101, which in this case gradually slow down the vehicle F, such that when the envelope EH* is reached, the vehicle has come to a standstill.

An overruling of the autonomous control interventions SEG by way of a manual control input by the driver may advantageously depend on the attribute K*. Advantageously, such overruling by the driver is normally possible, and impossible only in case of special attributes K* that indicate a particularly high degree of risk intensity.

Figure 2:
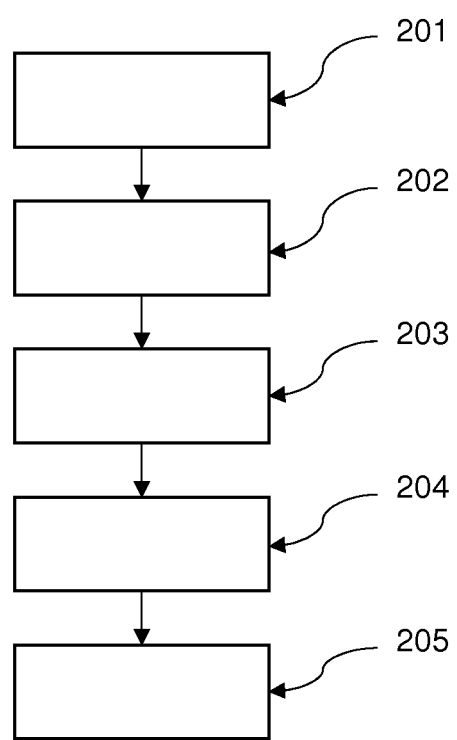
FIG. 2 shows a flowchart of a proposed method.

FIG. 2 shows a flowchart of a proposed method for automatically controlling a vehicle F 101 in a traffic network, with following steps: at step 201, providing respective envelopes $EH_i$ of a number I of flat geographical sub-regions $TB_i$ of the traffic network, and providing for each of the geographical sub-regions $TB_i$ an associated attribute $K_i$, the provision by a central unit ZE 102, wherein I=1, ..., I and I≥1 and $TB_i\in\{TB_1, ..., TB_I\}=\underline{TB}$, wherein the attribute $K_i$ indicates the intensity of a risk posed to the vehicle F 101 itself and/or to objects arranged in the sub-region $TB_i$ if the vehicle F 101 should enter into the respective geographical sub-region $TB_i$, wherein $K_i\in\{K_1, ... K_N\}=\underline{K}$ and N≥1; at step 202, transmitting by the central unit ZE 102 one or more envelopes $EH_i$ and of the associated attributes $K_i$ to the vehicle F 101; determining 203 the current position $POS_F$ of the vehicle F 101 in the traffic network; determining 204 a distance $d_{EH*}(POS_F)$ of the vehicle F 101 to the envelope EH* of the sub-region TB* that is closest to the position $POS_F$, wherein TB*$\in\underline{TB}$; and executing 205 automatic control interventions SEG in the longitudinal and/or transversal control or regulation process of the vehicle F 101, wherein the automatic control interventions SEG are executed depending on the distance $d_{EH*}(POS_F)$ and on the attribute K* assigned to the closest sub-region TB*:

$$SEG=SEG(d_{EH*}(POS_F),K^*), \text{ wherein } K^*\in\underline{K}. \quad (1)$$

Even though the invention was illustrated and explained in detail by preferred example embodiments, the invention is not limited by the disclosed examples, and other variations may be derived by the person skilled in the art without such being outside the protective scope of the invention. It is therefore clear that there is a plurality of possible variations. It is also clear that the example listed embodiments are really only examples that should not in any way be understood as a limitation of the scope of protection, of the application options, or of the configuration of the invention. Rather, the description above, and the description of the figures, allow the person skilled in the art to concretely implement the example embodiments and, knowing the disclosed inventive concept, the person skilled in the art being capable of making a variety of modifications with respect to the functionality or the arrangement of individual elements listed in an example embodiment, without such modifications being outside the scope of protection as defined by the claims and their legal pendants, such as more extensive clarifications in the description.

REFERENCE LIST

101 Vehicle F
102 Central unit
103 First unit
104 Second unit
105 Third unit
106 Fourth unit
107 Fifth unit 108 Interface for manual input
109 Sixth unit
110 Seventh unit
111 Vehicle FZ
112 Traffic infrastructure unit $V_{infra}$
201-205 Procedural steps

The invention claimed is:

1. A system to automatically control a vehicle F in a traffic network, the system comprising:
   a central unit ZE configured to provide respective envelopes $EH_i$ of a number I of flat geographical sub-regions $TB_i$ of the traffic network, as well as attributes $K_i$ assigned respectively to the geographical sub-regions $TB_i$, wherein i=1, . . . , I and I≥1, $EH_i \in \{EH_1, \ldots, EH_I\}=\underline{EH}$, and $TB_i \in \{TB_1, \ldots, TB_I\}=\underline{TB}$, wherein an attribute of the attributes $K_i$ indicates an intensity of a risk posed to the vehicle F and/or objects in a respective geographical sub-region of the geographical sub-regions $TB_i$ if the vehicle F should enter into the respective geographical sub-region, wherein $K_i \in \{K_1, \ldots, K_N\}=\underline{K}$ and N≥1, wherein the central unit ZE and the vehicle F are designed and set up to communicate data, including transmission of the envelopes $EH_i$ and associated attributes $K_i$ from the central unit to the vehicle, wherein TB defines a set of geographical sub-regions in the traffic network, and K defines a set of attributes;
   the vehicle F configured to:
   receive one or more envelopes of the envelopes $EH_i$ and associated attributes of the attributes $K_i$ transmitted by the central unit ZE;
   determine a current position $POS_F$ of the vehicle F in the traffic network;
   determine a distance $d_{EH*}(POS_F)$ of the vehicle F from an envelope EH* assigned to a geographical sub-region TB* closest to the current position $POS_F$ of the vehicle F from the received one or more envelopes, wherein the envelope EH*∈EH and the geographical sub-region TB*∈$\underline{TB}$; and
   execute automatic control interventions SEG in longitudinal and/or transversal control or regulation process of the vehicle F, wherein the automatic control interventions SEG are executed depending on the distance $d_{EH*}(POS_F)$ and an attribute K* assigned to the geographical sub-region TB*, wherein SEG=SEG($d_{EH*}(POS_F)$, K*), and wherein attribute K*∈K.

2. The system as claimed in claim 1, wherein the vehicle F is configured to execute the automatic control interventions SEG($d_{EH*}(POS_F)$, K*) only when the distance $d_{EH*}(POS_F)$ to the geographical sub-region TB* closest to the current position $POS_F$ reaches or undershoots a specified distance threshold value $G_{K*}$ that is dependent on the attribute K* assigned to the geographical sub-region TB*.

3. The system as claimed in claim 1, wherein the automatic control interventions SEG($d_{EH*}(POS_F)$, K*) comprise at least one the following control interventions:
   a reduction of a speed of the vehicle F to a predetermined speed $v_{soll}$ depending on the attribute K* and/or on the distance $d_{EH*}(POS_F)$; and/or
   a slow down of the vehicle F to a stationary position; and/or
   an execution of a longitudinal and transversal control or regulation, such that the vehicle F does not enter into the geographical sub-region TB*.

4. The system as claimed in claim 1, wherein the vehicle F is configured to, depending on the distance $d_{EH*}(POS_F)$ to the geographical sub-region TB* closest to the position $POS_F$, and depending on the attribute K* assigned to the geographical sub-region TB*, automatically actuate a system of the vehicle F to emit optical, and/or acoustic, and/or haptic signals to occupants of the vehicle F and/or to the surroundings of the vehicle F.

5. The system as claimed in claim 1, wherein the vehicle F is configured to, depending on the distance $d_{EH*}(POS_F)$ to the geographical sub-region TB* that is closest to the position $POS_F$, and depending on the attribute K* assigned to the geographical sub-region TB*, automatically cause the vehicle F to slow down to a stationary position, and then power the vehicle F down electrically.

6. The system as claimed in claim 1, wherein the central unit ZE is configured to manually input or specify envelopes $EH_i$ of the geographical sub-regions $TB_i$ of the traffic network.

7. The system as claimed in claim 1, wherein the central unit ZE is configured to, based on a current position $POS_{FZ}$ of a vehicle FZ in the traffic network as transmitted by the vehicle FZ to the central unit ZE, and depending on an attribute $A_{FZ}$ transmitted by the vehicle FZ to the central unit ZE, the attribute $A_{FZ}$ indicating a critical technical and/or traffic-related condition of the vehicle FZ, automatically determine an envelope EH of a geographical sub-region TB of the traffic network around the position $POS_{FZ}$ of the vehicle FZ and an attribute K assigned to the geographical sub-region TB, and provide the envelope EH, the geographical sub-region TB, and the attribute K to the central unit ZE, wherein the envelope EH∈EH, the geographical sub-region TB∈$\underline{TB}$, and the attribute K∈$\underline{K}$.

8. The system as claimed in claim 7, wherein ea following time-dependency applies to the envelope EH of the geographical sub-region TB: EH=EH(POSFZ(t)) and TB=TB(POSFZ(t)).

9. The system as claimed in claim 1, wherein the central unit ZE is configured to, based on an attribute $A_{infra}$, transmitted to the central unit ZE by a traffic infrastructure unit $V_{infra}$ arranged at a position $POS_{infra}$ in the traffic network, the traffic infrastructure unit $V_{infra}$ having at least one sensor system to capture a traffic condition and/or a weather condition in the surroundings of the traffic infrastructure unit $V_{infra}$, the attribute $A_{infra}$, indicating the critical traffic and/or weather condition in the area of the traffic infrastructure unit $V_{infra}$, automatically determine an envelope EH* of a geographical sub-region TB* around the position $POS_{infra}$ of the traffic infrastructure unit $V_{infra}$, as well as an attribute K* assigned to the geographical sub-region TB*, and provide the envelope EH*, the geographical sub-region TB*, and the attribute K* to the central unit ZE, wherein the envelope EH*∈TB, sub-region TB*∈$\underline{TB}$, and the attribute K*∈$\underline{K}$, and wherein the traffic infrastructure unit $V_{infra}$ is configured to determine whether there are critical traffic and/or weather conditions, and to determine the attribute $A_{infra}$, based on sensor data captured with the sensor system.

10. A method of automatically controlling a vehicle F in a traffic network, the method comprising:
   providing, via a central unit ZE, respective envelopes $EH_i$ for a number I of flat geographical sub-regions $TB_i$ of the traffic network, and attributes $K_i$ assigned respectively to the geographical sub-regions $TB_i$, wherein i=1, . . . , I and I≥1, $EH_i \in \{EH_1, \ldots, EH_I\}=\underline{EH}$, and $TB_i \in \{TB_1, \ldots, TB_I\}=\underline{TB}$, wherein an attribute of the attributes $K_i$ indicates an intensity of a risk posed to the vehicle F and/or objects in a respective geographical sub-region of the geographical sub-regions $TB_i$ if the vehicle F should enter into the respective geographical sub-region, wherein $K_i \epsilon \{K_1, \ldots, K_N\}=K$ and $N \geq 1$, wherein TB defines a set of geographical sub-regions in the traffic network, and K defines a set of attributes;

receiving, via the vehicle F, one or more envelopes of the envelopes $EH_i$ and associated attributes of the attributes $K_i$ transmitted by the central unit ZE;

determining a current position $POS_F$ of the vehicle F in the traffic network;

determining a distance $d_{EH^*}(POS_F)$ of the vehicle F to an envelope EH* assigned to a sub-region TB* that is closest to the current position $POS_F$ of the vehicle F from the received one or more envelopes, wherein the envelope EH*$\epsilon$EH and the geographical sub-region TB*$\epsilon$TB;

executing automatic control interventions SEG in longitudinal and/or transversal control or regulation process of the vehicle F, wherein the automatic control interventions SEG are executed depending on the distance $d_{EH^*}(POS_F)$ and an attribute K* assigned to the geographical sub-region TB*, wherein SEG=SEG($d_{EH^*}$(POS$_F$), K*), wherein the attribute K*$\epsilon$K.

11. The method as claimed in claim 9, wherein the method comprises executing the automatic control interventions SEG($d_{EH^*}$(POS$_F$), K*) only when the distance $d_{EH^*}$(POS$_F$) to the geographical sub-region TB* closest to the current position POS$_F$ reaches or undershoots a specified distance threshold value $G_{K^*}$ that is dependent on the attribute K* assigned to the geographical sub-region TB*.

12. The method as claimed in claim 9, wherein the automatic control interventions SEG($d_{EH^*}$(POS$_F$), K*) comprise at least one of the following control interventions:

reducing a speed of the vehicle F to a predetermined speed $v_{soll}$ depending on the attribute K* and/or on the distance $d_{EH^*}$(POS$_F$); and/or slowing down the vehicle F to a stationary position; and/or executing a longitudinal and transversal control or regulation, such that the vehicle F does not enter into the geographical sub-region TB*.

13. The method as claimed in claim 9, wherein depending on the distance $d_{EH^*}$(POS$_F$) to the geographical sub-region TB* closest to the position POS$_F$, and depending on the attribute K* assigned to the geographical sub-region TB*, the method comprises automatically actuating a system of the vehicle F to emit optical, and/or acoustic, and/or haptic signals to occupants of the vehicle F and/or to the surroundings of the vehicle F.

14. The method as claimed in claim 9, wherein depending on the distance $d_{EH^*}$(POS$_F$) to the geographical sub-region TB* that is closest to the position POS$_F$, and depending on the attribute K* assigned to the geographical sub-region TB*, the method comprises automatically causing the vehicle F to slow down to a stationary position, and then power the vehicle F down electrically.

15. The method as claimed in claim 9, wherein the method comprises manually inputting or specifying to the central unit ZE envelopes $EH_i$ of the geographical sub-regions $TB_i$ of the traffic network.

16. The method as claimed in claim 9, wherein based on a current position $POS_{FZ}$ of a vehicle FZ in the traffic network as transmitted by the vehicle FZ to the central unit ZE, and depending on an attribute $A_{FZ}$ transmitted by the vehicle FZ to the central unit ZE, the attribute $A_{FZ}$ indicating a critical technical and/or traffic-related condition of the vehicle FZ, the method comprises automatically determining via the central unit ZE an envelope EH of a geographical sub-region TB of the traffic network around the position $POS_{FZ}$ of the vehicle FZ and an attribute K assigned to the geographical sub-region TB; and providing the envelope EH, the geographical sub-region TB, and the attribute K to the central unit ZE, wherein the envelope EH$\epsilon$EH, the geographical sub-region TB$\epsilon$TB, and the attribute K$\epsilon$K.

17. The method as claimed in claim 16, wherein a following time-dependency applies to the envelope EH of the geographical sub-region TB: EH=EH(POSFZ(t)) and TB=TB(POSFZ(t)).

18. The method as claimed in claim 9, wherein based on an attribute $A_{ifra}$, transmitted to the central unit ZE by a traffic infrastructure unit $V_{infra}$ arranged at a position $POS_{infra}$ in the traffic network, the traffic infrastructure unit $V_{infra}$ having at least one sensor system to capture a traffic condition and/or a weather condition in the surroundings of the traffic infrastructure unit $V_{infra}$, the attribute $A_{infra}$ indicating the critical traffic and/or weather condition in the area of the traffic infrastructure unit $V_{infra}$, the method comprises:

automatically determining an envelope EH* of a geographical sub-region TB* around the position $POS_{infra}$ the traffic infrastructure unit $V_{infra}$, as well as an attribute K* assigned to the geographical sub-region TB*; and providing the envelope EH*, the geographical sub-region TB*, and the attribute K* to the central unit ZE, wherein the envelope EH*$\epsilon$EH, the geographical sub-region TB*$\epsilon$TB, and the attribute K*$\epsilon$K;

wherein the traffic infrastructure unit $V_{infra}$ is configured to determine whether there are critical traffic and/or weather conditions, and to determine the attribute $A_{infra}$, based on sensor data captured with the sensor system.

* * * * *

UNITED STATES PATENT AND TRADEMARK OFFICE
CERTIFICATE OF CORRECTION

| | | |
|---|---|---|
| PATENT NO. | : 11,030,900 B2 | |
| APPLICATION NO. | : 16/496099 | |
| DATED | : June 8, 2021 | |
| INVENTOR(S) | : Robert Klarner et al. | |

It is certified that error appears in the above-identified patent and that said Letters Patent is hereby corrected as shown below:

In the Specification

Column 2, Line 1:
Now reads: "K"
Should read: -- $K_i$ --

Column 3, Line 27:
Now reads: "K"
Should read: -- $K_i$ --

Column 6, Line 43:
Now reads: "K"
Should read: -- $K_i$ --

Column 9, Line 12:
Now reads: "attribute $A_{intra}$"
Should read: -- attribute $A_{infra}$ --

Column 10, Line 29:
Now reads: "K"
Should read: -- $K_i$ --

Column 10, Line 31:
Now reads: "K"
Should read: -- $K_i$ --

In the Claims

Claim 1, Column 13, Line 15:
Now reads: "$\{EH_1, ..., EH_I\} = EH$"

Signed and Sealed this
Third Day of May, 2022

Katherine Kelly Vidal
*Director of the United States Patent and Trademark Office*

Should read: -- $\{EH_1, ..., EH_I\} = \underline{EH}$ --

Claim 1, Column 13, Line 25:
Now reads: "TB"
Should read: -- $\underline{TB}$ --

Claim 1, Column 13, Line 26:
Now reads: "K"
Should read: -- $\underline{K}$ --

Claim 1, Column 13, Line 38:
Now reads: "EH* ϵ EH"
Should read: -- EH* ϵ $\underline{EH}$ --

Claim 1, Column 13, Line 46:
Now reads: "K* ϵ K"
Should read: -- K* ϵ $\underline{K}$ --

Claim 7, Column 14, Line 29:
Now reads: "EH** ϵ EH"
Should read: -- EH** ϵ $\underline{EH}$ --

Claim 8, Column 14, Line 31:
Now reads: "ea"
Should read: -- a --

Claim 9, Column 14, Line 50:
Now reads: "EH*** ϵ TB"
Should read: -- EH*** ϵ $\underline{EH}$ --

Claim 10, Column 15, Line 1:
Now reads: "$K_i$ ϵ $\{K_1, ..., K_N\}$ = K"
Should read: -- $K_i$ ϵ $\{K_1, ..., K_N\}$ = $\underline{K}$ --

Claim 10, Column 15, Line 2:
Now reads: "TB"
Should read: -- $\underline{TB}$ --

Claim 10, Column 15, Line 3:
Now reads: "K"
Should read: -- $\underline{K}$ --

Claim 10, Column 15, Line 13:
Now reads: "EH* ϵ EH"
Should read: -- EH* ϵ $\underline{EH}$ --

CERTIFICATE OF CORRECTION (continued)
U.S. Pat. No. 11,030,900 B2

<u>Claim 18, Column 16, Line 28</u>:
Now reads: "$A_{ifra}$"
Should read: -- $A_{infra}$ --